(12) United States Patent
Leischner et al.

(10) Patent No.: US 6,979,043 B2
(45) Date of Patent: Dec. 27, 2005

(54) TORSION ABSORBER FOR ROLLER CRANK ASSEMBLIES

(76) Inventors: Henry G. Leischner, 104 E. South St., Mt. Sterling, IL (US) 62353; Patrick R. Cagle, RR#!, Box 51A, Arenzville, IL (US) 62611

( * ) Notice: Subject to any disclaimer, the term of this patent is extended or adjusted under 35 U.S.C. 154(b) by 0 days.

(21) Appl. No.: 10/326,240

(22) Filed: Dec. 19, 2002

(65) Prior Publication Data
US 2003/0151271 A1    Aug. 14, 2003

Related U.S. Application Data

(60) Provisional application No. 60/356,288, filed on Feb. 12, 2002, provisional application No. 60/372,580, filed on Apr. 13, 2002.

(51) Int. Cl.[7] .................................................. B60P 7/04
(52) U.S. Cl. ......................................... 296/98; 464/61
(58) Field of Search ............................. 296/98; 464/51, 464/61, 160–161, 57, 136, 169; 74/545

(56) References Cited

U.S. PATENT DOCUMENTS 1,431,401 A * 10/1922 Hupp
1,662,223 A * 3/1928 Werner et al.
1,712,455 A   5/1929 Connolly
2,514,394 A * 7/1950 Irving
3,878,695 A * 4/1975 Pitner .......................... 464/136
4,302,043 A   11/1981 Dimmer et al.
4,505,512 A   3/1985 Schmeichel et al.
4,598,496 A * 7/1986 Van Daele .................... 49/357
5,123,311 A * 6/1992 Dymek ........................ 403/287
5,157,988 A * 10/1992 Pinkstock ................... 74/594.3
5,762,002 A   6/1998 Dahlin et al.
5,765,901 A   6/1998 Wilkens
5,924,758 A   7/1999 Dimmer et al.
6,142,553 A   11/2000 Bodecker
6,206,449 B1  3/2001 Searfoss
6,318,790 B1  11/2001 Henning et al.

FOREIGN PATENT DOCUMENTS

JP    0159418    * 8/1985    .................. 464/51

* cited by examiner

Primary Examiner—Dennis H. Pedder
(74) Attorney, Agent, or Firm—Bruce Burdick (57) ABSTRACT

A resilient torque absorber is placed between a roll bar and a U-joint of roll bar mechanism such as that used in roll-tarp covers for truck trailers. The absorber allows more precise adjustment of tightness and helps prevent accidents caused by over-tightening of tarps or by tarps loosening during load settling.

39 Claims, 9 Drawing Sheets

TORSION ABSORBER FOR ROLLER CRANK ASSEMBLIES

CROSS REFERENCE TO RELATED APPLICATIONS (if applicable)

This application is based on copending U.S. provisional patent applications no. 60/356,288 filed Feb. 12, 2002 and no. 60/372,580 filed Apr. 13, 2002.

NOT FEDERALLY SPONSORED RESEARCH & DEVELOPMENT

This invention was not Federally sponsored or funded.

BACKGROUND OF THE INVENTION

The invention relates to roll-tarp systems and to crank assemblies such as, for example, those classed in class 296, subclasses 98–100.

Various types of truck, trailer and container bodies are designed to be loaded through an open top. Such bodies are typically used to haul grain, earth or refuse. It is desirable to use tarpaulins or other coverings to close the open tops of such containers. The tarpaulins serve to shelter the contents of trucks, trailers or containers against the elements and to maintain the contents in the containers when the containers are exposed to high winds or moved from place to place.

Several systems are known for covering truck, trailer and containers with tarpaulins. Typically, the covering is unrolled from a long tube by associated hardware from an open position in which the covering is entirely wrapped around the tube, exposing the interior of the container, to a closed position in which the covering is spread over the top of the container. These systems tend to use fiberglass or metal bows to span the width of the opening and support the covering at regular parallel spaced intervals along the length of the open top.

An example of an excellent tarp system that has become extremely popular and widely used commercially is shown in U.S. Pat. No. 4,302,043 to Dimmer et al. assigned to Wahpeton Canvas Company, Inc. of Wahpeton, S. Dak., which sells that system commercially under the trademark SHUR LOK. As shown in the Dimmer et al reissue patent, a covering is attached along one lengthwise edge to one edge of the container and along an opposite lengthwise edge to a roll tube that, in turn, is connected at one end by a universal joint to a crank. The universal joint and crank can be removably attached to the roll tube by a spline and pin or other similar mechanism to allow customization. An operator at ground level can turn the crank causing the universal joint to rotate the roll tube to cause the cover to roll up lengthwise on the tube to uncover the top of the trailer or container or to unroll lengthwise from the tube to cover the top of the trailer or container. The end of the roll tube to which the universal joint and crank arm are attached can be described as the active end because the torque or turning force is applied there. Conversely, the opposite end can be described as the passive end because the torque is applied to the opposite end indirectly through the length of the tube.

The Shur Company roll-tarp system has found such widespread acceptance among truck owners because it is relatively quick to use and usually looks neat and uncluttered when latched in place. Since the Shur Company roll-tarp system latches under a ledge at the top of the trailer, the front, sides and rear of the truck are untouched and can have markings and signs that are not cluttered by tie down straps and hooks prevalent in many other tarp systems. Even though roll-tarps are desirable for their ease of use and neat appearance, there are some areas where the roll-tarp system might be improved. When large or uneven loads are present such that the top of the load is higher than the bows, which is a clear misuse of the tarp system, the tarp must pass over a longer distance in covering the "over-bow" portion of the load relative to the remainder of the container and this can result in the tarp being tight in the area over-bow but loose everywhere else unless the roll tube is excessively stressed by over-twisting the crank and applying a huge torque to the roll tube to pull very hard on the tarp to try to stretch the tarp sufficiently to put the roll tube into a proper latched position under a latch plate on an upper side edge of the trailer. This is a risky action, which operators should recognize as being risky, but since truckers are often paid by the load or weight, when they have bulky materials or light materials there is a strong financial incentive to try to maximize the load even to the extent of temporary unsafe conditions. This can cause all kinds of problems, but since truckers are paid by load or weight, they may nevertheless feel compelled by financial considerations to have loads that extend over the bows in some portion of the container. To maximize the load, the trucker may start with an overbow load and think that by rocking the trailer forward and back (by accelerating and braking or jerking the clutch) to try to jerk the load into even distribution, but that is not usually very successful, especially if the load is sticky. Even if successful, that jerking obviously adds wear and tear on drive trains, transmissions, brakes and tires. Another solution truckers might try to spread out loads that extend above the bows is to climb up on the edge of the trailer with a shovel and balance precariously while trying to level the load with a shovel. However, that risky maneuver raises the possibility of slip and fall injury to the trucker during this climbing, balancing, and shoveling, particularly if the weather is icy, snowy, or rainy, or if the load is wet and slippery. So, a trucker may decide that the best compromise is to just crank real hard on the tarp to try to stretch it over the over-bow load so that risky climbing up the trailer or destructive jerking of the drive train can be avoided. This overstressing requires tremendous torque because tarps do not stretch easily. A typical torque for normal tightening of a roll-tarp might be specified as 60 foot-pounds of pressure on the roll bar, as measured one foot out on the crank handle from the roll bar. An over-bow load might take 200 pounds or more of force on the crank handle to rotate the roll tube sufficiently to latch for a sufficient distance that the trucker feels it probably won't come loose during travel, and even then there is likely to be a portion of the roll bar not fully latched. Since 200 pounds or more of force on the crank handle is a lot of force even for a strong trucker. Unless the trucker weighs well over 200 pounds, that force may be sufficient to lift the trucker off the ground, which is obviously undesirable. If the crank handle is slippery, any slip under that kind of pressure may result in the handle slipping out of the operator's hand and then being whipped around viciously with possible injury to the operator or others nearby. Also, since the crank arm might typically be 10 feet long, 2000 foot pounds or more of torsional force might actually be put on the U-joint and roll tube by this over-bow tarp tightening action, and this can lead to damage or even breaking of the roll tube or crank or U-joint, with consequent risk to everyone around, including adjacent vehicles, but especially to the operator himself. If the roll bar breaks, it may break several feet forward of the back of the truck, and this requires repair and welding of a new end on the roll bar at significant expense and significant delay to the trucker and with resultant delay in delivery of the load. If the roll bar does not break, it will still be in the overstressed state and is also now "cocked" so that if an unsuspecting person unlatches the crank to roll up the tarp to uncover the load, there could be an undesirable whipping action of the crank as it seeks to rotate to relieve 2000 foot pounds or more of stress. Also, the operator of crank handles which bend into locking position force the operator to use a shortened portion of the handle to lock the handle into position and must let go with one hand to use the other hand to operate any pin or lock. This accentuates the risk of the crank slipping and popping back at the operator. Another problem created by oversize loads is that if the load settles, the stretched tarp may become loose enough to flap in the wind like a flapping sail, increasing wear on the tarp and shortening its useful life. If the loads settles sufficiently, the tarp might even come unlatched and act like a giant spinnaker or parachute, pulling the crank handle and mount right off the back or side of the trailer and flipping it around with possible damage to adjacent vehicles. Roll-tarps work well when used properly and are an excellent accessory for open top trailers and instructions from manufacturers typically warn against over-bow tarping, but for the above reasons the warning may be disregarded.

Rather than providing a warning that users will ignore, it would therefore be of significant benefit to the advancement of technology in the roll tarp industry to introduce design improvements to attempt to minimize the risks associated with even such clear misuse of the tarp system by helping minimize excessive torque on the roll-tarp systems noted above through design improvements. Even though the manufacturer of the tarp system may not be responsible for such misuse of its systems, it is desirable to minimize risk even in the event of misuse.

In normal operation the tarp may loosen slightly during road travel. This loosening can be due to various reasons such as for example settling of the load, self-straightening of the tarp, or unwrinkling of the tarp. So, it is sometimes desirable or even required to further tighten a previously tightened tarp. It would be desirable to have some means of automatically tightening the tarp without the operator having to constantly monitor the tarp, notice when it is getting loose, stop the truck, get out, loosen the crank, crank the roll bar to tighten the tarp, refasten the crank, and get back in the cab. Motorized tarp covers may allow simpler tightening of loose roll bars but such tightening is not generally automatic and requires the operator to notice the need for tightening and then to activate the motorized crank.

Further, there is a need to have any roll tarp securing device be improved so that even in the event of failure the operative parts do not come loose from the overall assembly. Loose parts could pose a hazard to other motorists.

There is, in summary, a need for an improved roll-tarp system to increase the safety and reliability for truckers and other roll-tarp users.

BRIEF SUMMARY OF THE INVENTION

In a first exemplary embodiment, a limited rotation torsion spring is placed between the roll bar and crank handle of a roll-tarp system to allow controlled stressing of the roll bar to accommodate occasional overheight loads and help to keep tension on the tarp to keep the tarp tight and help keep the roll bar latched even if the load settles. This torsion spring or torsion absorber has applicability to a wide variety of roll bar cranking assemblies, both manual and motorized, especially those using U-joint connections. The crank handle can be weighted and padded to make it easier to use and safer.

BRIEF DESCRIPTION OF THE DRAWINGS

The foregoing and other novel features and advantages of the invention will be better understood upon a reading of the following detailed description taken in conjunction with the accompanying drawings wherein:

FIGS. 1–25 disclose several exemplary adapters for connecting a rotary power shaft to a roll bar of a roll-tarp assembly, said adapters comprising a first connector configured for transferring rotary power to the roll bar, a second connector configured for receiving rotary power from the power shaft, and a resilient member connecting said first and second connectors for transferring rotary power from said first to said second connector and allowing limited, force-responsive rotation of said first connector relative to said second connector, so as to help minimize overtorque on said connectors and roll bar.

DESCRIPTION OF THE PREFERRED EMBODIMENTS

Figure 1:
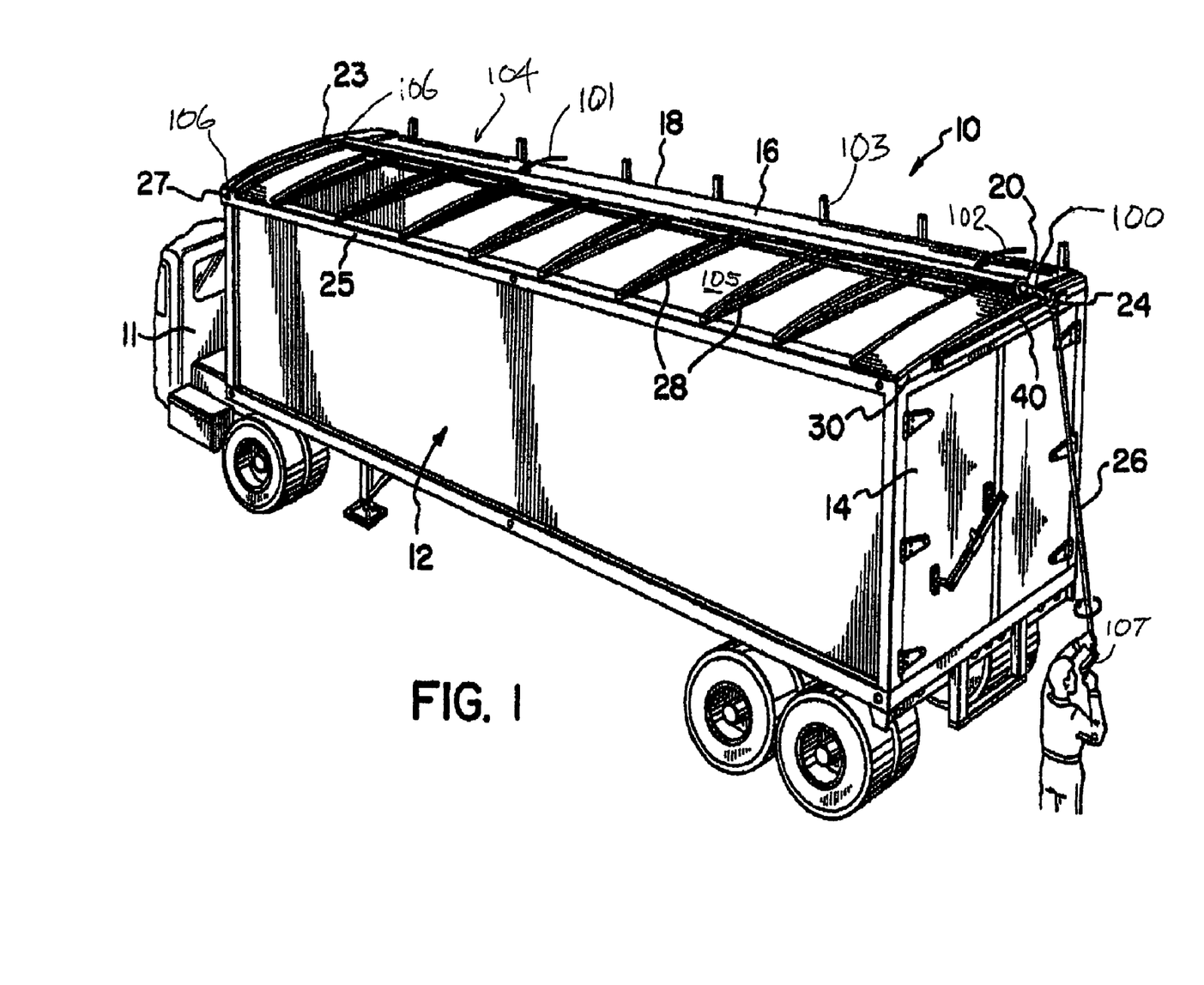
FIG. 1 is a left, rear, upper perspective view of a truck trailer having a side-to-side roll-up tarp system, employing a first exemplary torsion absorber in a crank arm for tensioning an active end of a roll bar.
Figure 2:
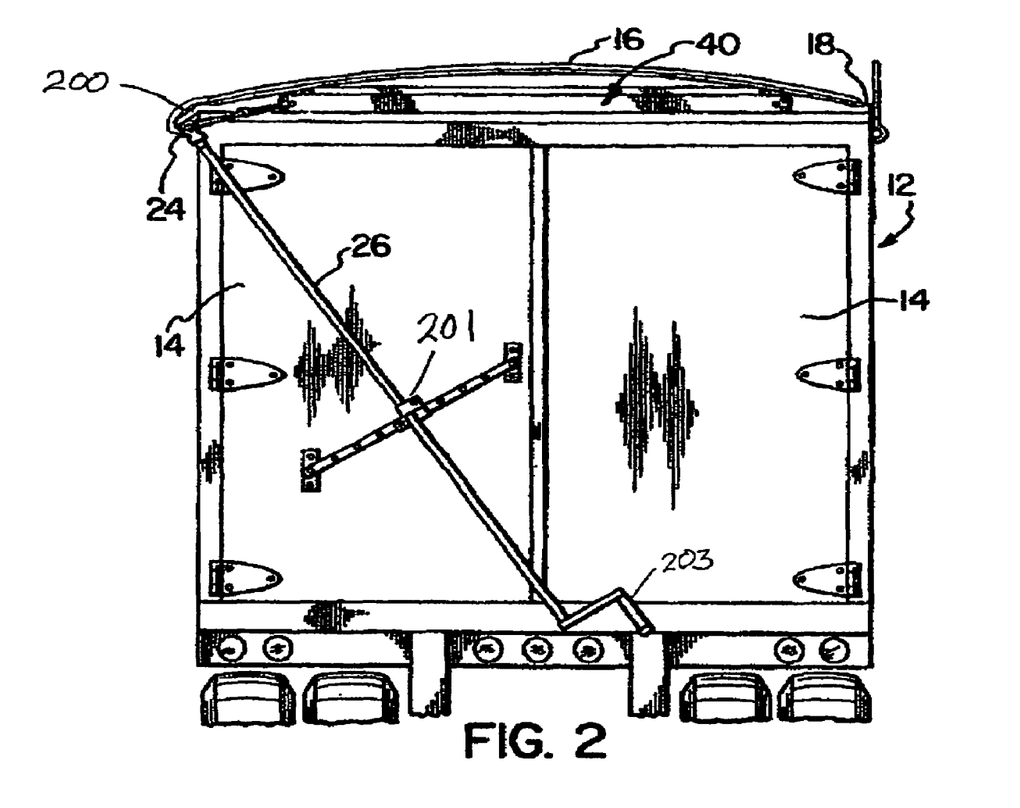
FIG. 2 is a rear view of the trailer and system of FIG. 1 with the tarp extended to cover the trailer and the crank arm in a stored position.

Referring now to the drawings, and initially to FIGS. 1 and 2, an 18-wheeler truck trailer rig 10 includes as principal components a truck cab 11 and an open top container trailer 12. Truck cab 11 would have 8 rear wheels, but only 2 are shown. The container 12 is particularly suitable for hauling grain, earth, refuse, or the like, which generally is loaded into the container 12 through the open top. Generally material is removed from the container 12 through the top (for example by a suction hose), a trap door in the floor (not shown), or rear doors 14 (for example by a hydraulic lift (not shown) either in rig 12 or in a dumping station (not shown). A similar trailer construction is shown in U.S. Pat. No. Re. 31,746, the disclosure of which is incorporated in its entirety by reference herein to the extent not in conflict with anything here.

The exemplary container 12 is provided with a cover system 104 to protect the contents from the elements such as rain, sleet, snow or hail, and to ensure that they are retained within the container 12 during high winds produced by weather or by movement of the trailer. An exemplary torsion absorber 100 is included in system 104 for reasons described below. System 104 is merely one example of a roll-tarp system that can be improved by addition of absorber 100. System 104 includes a roll up covering 16, typically a tarpaulin, but which may be constructed of vinyl, canvas or other flexible materials or which could be a series of stacked interconnected rigid or flexible panels (not shown) or any other covering which can be extended over opening 105 of container 12 by use of a roll bar 20. Roll bar 20 may be tubular or solid, may be of one piece or several interconnected pieces. Covering 16 is secured to container 12 along a first lengthwise edge 18 by metal hardware known in the art. (See, for example, U.S. Pat. No. Re. 31,746.) A free, lengthwise edge, opposite edge 18, of covering 16 is secured to a roll bar or tube 20. The tube 20 is fitted at its rear active end with a torsion absorber 22 connected to a universal joint 24. A manual crank assembly 26 is, in turn, connected to the universal joint 24 and can be locked into an adjustable mount 201 or released from lock 201 and pivoted outwardly about U-joint 24 to allow roll bar 20 to be rotated by turning a handle 202 of crank 26. When roll bar 20 has been turned the desired amount weighted crank handle 202 or unweighted crank handle 107 can once again be pivoted downwardly back into position adjacent door 14 and roll bar 20 rotated sufficiently to align crank handle 202 with mount 201 so that handle 202 can again be locked onto mount 201 to lock roll bar 20 in a certain rotational position. Weighted crank handle 202 is weighted by a weight 203 of any conventional design to provide additional torque to help counter any tendency of crank handle 202 to lift due to torsional forces on roll bar 20 from absorber 100. Crank handle 202 may also be padded with a resilient rubber or plastic sleeve, preferably weather resistant, to help minimize risk if crank handle 202 lifts quickly enough that it might hit an operator. System 104, with the exception of absorber 100, is commercially available from Shur Company of Yankton, S. Dak. or other manufacturers and distributors of competing roll-tarp systems. Absorber 100 can be part of a new roll-tarp assembly or can be an after-market accessory we consider will be recognized as very important for more user-friendly operation of the Shur Co roll-tarp system and similar systems, including motorized systems.

Suitable bows 28 span the width of container 12 at spaced intervals over opening 105 to support covering 16 over container 12 when covering 16 is in a deployed condition. An operator may manually turn crank assembly 26 causing covering 16 to be rolled up on tube 20 thereby uncovering container 12. When rolled in the opposite direction covering 16 is unfurled over opening 105. A resilient cord 23 is attached at one end to a latch plate 200 at a hole 27 and at the other end to a passive end 106 of roll bar 20. An upper rear edge 30 associated with the trailer body is provided with a roll assist mechanism 40, the specifics of which are described in U.S. Pat. No. 5,924,758 to Dimmer et al assigned to Shur Company and which are produced by Shur Company and others.

Figure 3:
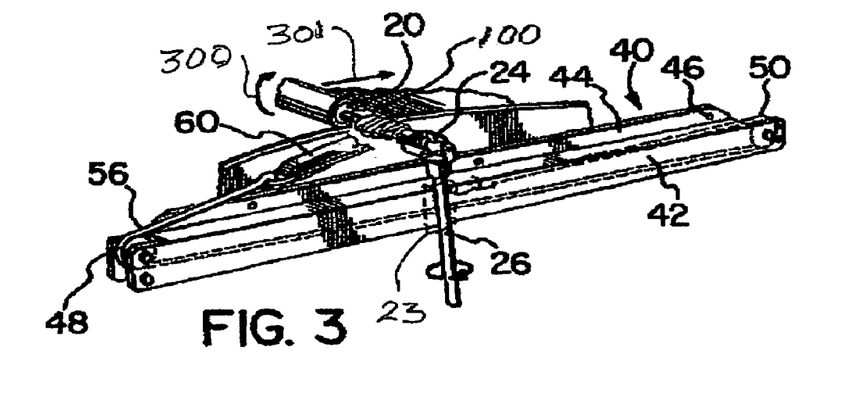
FIG. 3 is a rear perspective view showing greater detail of an exemplary location of the exemplary torsion absorber.

Turning now to FIG. 3, exemplary torsion absorber 100 is placed between U-joint 24 and roll bar 20 to allow limited relative rotation between roll bar 20 and U-joint 24. The nature of U-joint 24 is that it only allows crank handle 202 to be lowered sufficiently to lock it onto lock 201 when it is in one of four positions 90 degrees apart. This we perceive as an opportunity for significant improvement in the Shur Company system and in all other similar or different roll bar systems using a crank handle connected to the roll bar by a U-joint. The problem with just having four positions 90 degrees apart is that when dealing with a relatively unstretchable cover such a tarpaulin, the proper position may be 20 degrees more than one position and yet an extra 70 degrees of rotation will be required due to the four position nature of the U-joint such as is the case with U-joint 24. That can result in tremendous additional stresses on the roll bar, even to the point of sometimes causing the connections between crank handle 202 and roll bar 20 to break with obvious adverse safety implications to the operator holding the crank handle 202 when this happens or anyone standing nearby. The alternative, which is undesirable, is to under-tighten the tarp by 20 degrees with the possibility that roll bar 20 may come loose from latch plate 200 while the rig 10 is traveling down some interstate highway at high speed with resultant damage to the rig 10, which the driver will then have to try to explain to his boss or dispatcher. The recognition of the precise nature of the improvement opportunity allowed us to solve it. The opportunity is addressed by the ingenious use of a torsion spring (described below) between the roll bar 20 and U-joint 24 to allow limited relative rotation between roll bar 20 and U-joint 24 of some desired amount, such as, for example, 180 degrees, against a spring force. Absorber 100 is preferably chosen so that the torsional force transmitted through the spring prior to spring compression is sufficiently high to generally cause rotation of roll bar 20 with a relatively constant spring force and only slight axial compression or expansion of absorber 100 during torsional compression of the spring (described below) so that excessive torsional forces are avoided. With this amount of rotation, the problem of 70 degrees of overstress previously noted is largely eliminated, as the U-joint can be rotated an extra 160 degrees relative to the roll bar to allow the U-joint to be placed in the next 90 or 180 degree rotational position when crank handle 202 is lowered and locked. We have also largely solved much of the loosening during travel problem with over-bow loads or even with normal under-bow loads, because torsion absorber 100 will cause limited rotation of roll bar 20 to maintain tightness of tarp 16 while crank handle 202 is locked in mount 201 while still maintaining sufficient rotational pressure on roll bar 20 to keep roll bar 20 latched under latch plate 200. In the example just noted that would be about 180 degrees of rotation. So, when an oversize load settles, torsion absorber 100 just causes roll bar 20 to tighten to take up the slack and the truck driver never knows the difference and his tarp just stays in place when it might have otherwise come loose.

Looking further at FIG. 3, there is also shown an exemplary roll assist mechanism 40, which includes a housing 42 with an attachment flange 44 with apertures 46 for attachment to an upper rear of container 12. Housing 42 has pulleys 48 and 50 at opposite ends around which is positioned a stretch cord 56 fitted with a strap 60 which can be looped around roll bar 20 adjacent torsion absorber 100. Mechanism 40 pulls roll bar 20 away from edge 18 and thus toward a position where tarp 16 covers opening 105. No assist is needed to pull roll bar 20 toward edge 18 because tarp 16 will cause that to occur as tarp 16 is rolled up as shown by arrow 300 onto roll bar 20 which will inherently cause roll bar to move in the direction shown by arrow 301. Other roll assists could be used provided they do not interfere with the operation of roll bar 20 or absorber 100.

Figure 4:
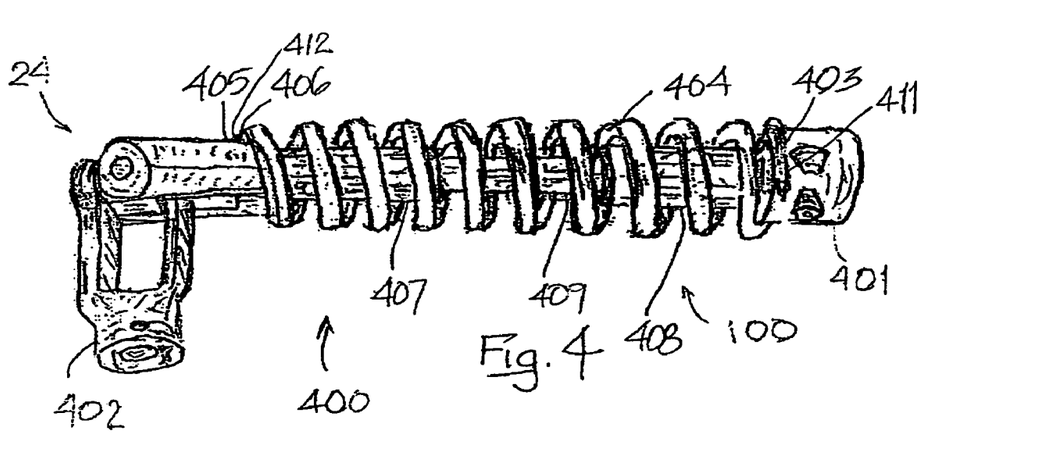
FIG. 4 is side view of the exemplary torsion absorber of FIGS. 1–3.

Referring next to FIG. 4, an exemplary torsion absorber unit 400 comprises U-joint 24 and absorber 100. Simply taking a standard Shur Company U-joint and cutting off one spline connector 401 and leaving the other connector 402 allows easier manufacture of unit 400. Connector 401 is then welded to one end 403 of a helical spring 404 by a weld 411 and the cut end 405 of U-joint 24 is welded to the other end 406 of spring 404 by a weld 412. Connector 401 is thus automatically properly splined to match roll bar 20. Another option would be to have one end be a spline and the other end be a stub shall so that it could simply slip into a mating spline connection without altering any parts. In order to prevent lateral (i.e. concave up or concave down in FIG. 4 or FIG. 5) bending of absorber 100, two tubular sleeves 407 and 408 are welded to end 405 and connector 401, respectively, and a solid or tubular slide piece 409 is welded to either end 405 or connector 401 (but not both) and disposed between sleeves 407 and 408 prior to welding spring 404 onto end 403 and connector 401. Sleeves 407 and 408 would preferably fit closely around piece 409 to prevent any significant lateral bending of absorber 100. A locking bolt 410 passes through connector 401 to engage of conventional annular recess (described below) to retain connector 401 attached to roll bar 20 or crank assembly 26. Alternatively, tube 409 could be eliminated and sleeves 407 and 408 made to telescope closely on each other. This telescopic connection of piece 409 with sleeves 407 and 408 allows absorber 100 to lengthen or shorten axially as spring 404 is stressed and unstressed, and serves to limit the maximum compression of spring 404. As spring 404 compresses, tube 409 will eventually abut against both end 405 and connector 401 to "bottom out" absorber 100 and prevent any further compression of spring 404, thus helping to prevent damage to absorber 100. Similarly, to prevent overextension of absorber 100, and to even help prevent loss of crank handle 202 in the event of breakage of absorber 100, an outer case (not shown) could be provided to limit outward movement. Alternately, a cable (not shown) could be fixed to both end 405 and connector 401, such as passing inside and through spring 404 to prevent accidental separation of end 405 and connector 401. Such an overextension preventer might be desirable to prevent crank handle 202 from falling into adjacent traffic should absorber 100 come apart for any reason during travel. All rotational force transmitted through absorber 100 passes through spring 404. Spring 404 is therefore chosen so as to provide sufficient spring force to resist twisting of spring 404 during normal furling and unfurling of system 104, but to allow relative rotation between end 405 and connector 401 when roll bar is tightened under latch plate 200 so as to allow crank handle 202 to be rotated relative to roll bar 20 and thus allow U-joint 24 to be rotated into one of the 90 degree rotational positions required by U-joint 24 once the roll bar 20 is latched, without any over-rotation of crank handle 202.

Figure 5:
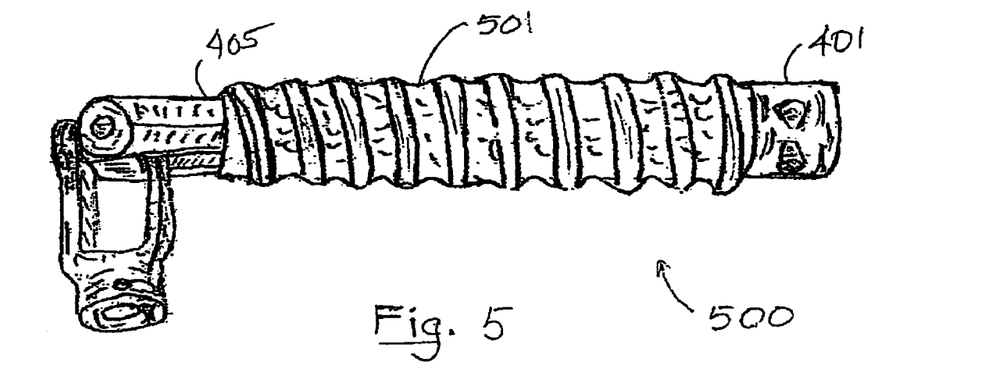
FIG. 5 is side view of the exemplary torsion absorber of FIG. 4 with a protective cover.
Figure 6:
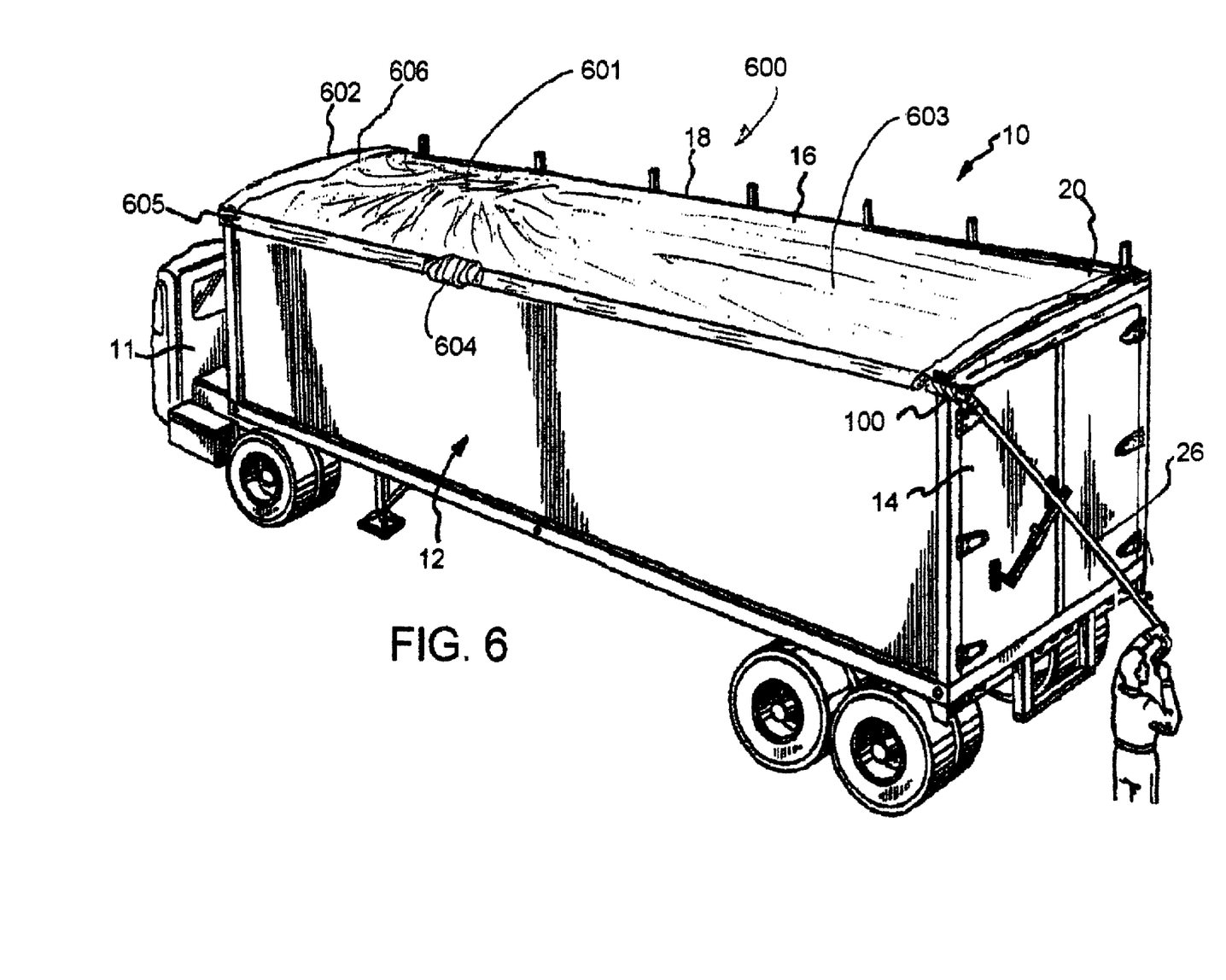
FIG. 6 is a left, rear, upper perspective view of a truck trailer having a side-to-side roll-up tarp system, employing a first exemplary torsion absorber in a crank arm for tensioning an active end of a roll bar, but with an overheight load.
Figure 7:
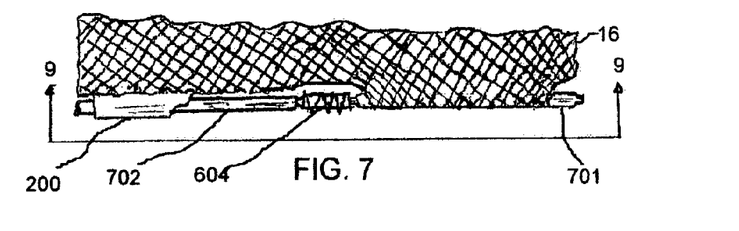
FIG. 7 is a top view in partial cutaway of an exemplary second roll-up tarp system having a second torsion absorber.

Referring to FIG. 5, another exemplary absorber unit 500 is shown. Internally, absorber unit 500 is like unit 400, but unit 500 also has an external rubber or plastic cover 501 and has seals (not shown) within end 405 and connector 401 to prevent water and other debris from entering into absorber 100 and causing damage to unit 100. Cover 501 significantly extends the useful life of unit 500 since the professional trucks travel through all sorts of hostile environments such as dust, rain, accidental spills of load materials, corrosive chemicals such as road salt, hot sunshine, and the numerous other evils incident to exposure on a professional truck rig traveling the highways and byways of the USA or other country. Cover 501 could be eliminated and a telescoped case (not shown) or rigid outer case (not shown) substituted to prevent overextension of absorber 100, and to prevent separation of absorber 100 in the event of breakage of any internal components such as spring 405 in the event of misuse.

Figure 8:
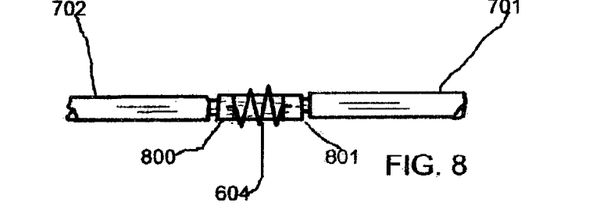
FIG. 8 is a top view of the exemplary system of FIG. 7, but showing just a portion of a roll bar and torsion absorber, which is aligned adjacent to a FIG. 7 for easy comparison.
Figure 9:
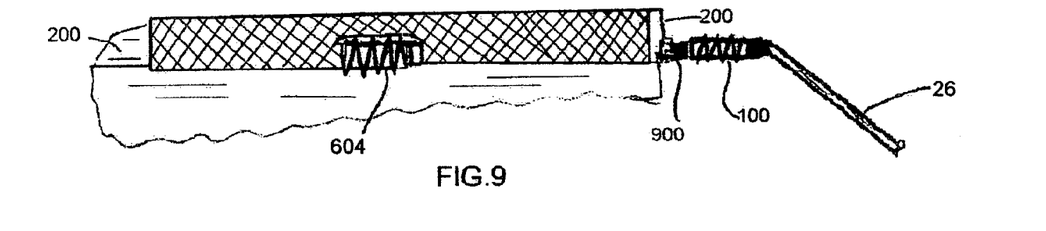
FIG. 9 is side elevational view in partial cutaway of the exemplary system of FIG. 8 and FIG. 9.

Referring next to FIGS. 6–9, a modified exemplary cover system 600 is shown in a position covering an oversized load 601. Generally, but not necessarily, overheight loads are overheight near a front 602 of trailer 12. Tarp 16 must extend further over load 601 than at a rear portion 603 of trailer 12 so tarp 16 is somewhat loose at rear portion 603. This problem is minimized or even eliminated by use of an additional torsion absorber 604 placed in a modified roll bar 605. Crank 26 is rotated so as to unroll tarp 16 over trailer 12 including overheight load 601 and over and then under latch plate 200 in normal manner. But now, with absorber 604 in place, crank 26 can be rotated some more to rotate rod portion 701 further than portion 702, thus allowing the tightening of a rear tarp portion 603 more than a front portion 606 and any portion overlying load 601. Overheight load 601 is thus accommodated and tarp 16 remains nice and taut throughout and both portions 701 and 702 are latched neatly and securely under plate 200. If load 601 settles, the torsional stress residual in absorbers 100 and 604 will both work to further tighten tarp 16 as required to adjust for such settling. The result is a far more secure tarp 16 and a far happier truck driver. As shown in FIG. 8, suitable spline connections 800 and 801 would be provided between second absorber 604 and portions 702 and 701, respectively, to assure proper rotation. Likewise, as seen in FIG. 9, a spline connection 900 assures co-rotation of crank 26 and connector 401 (see FIGS. 4–5) and portion 701.

Figure 10:
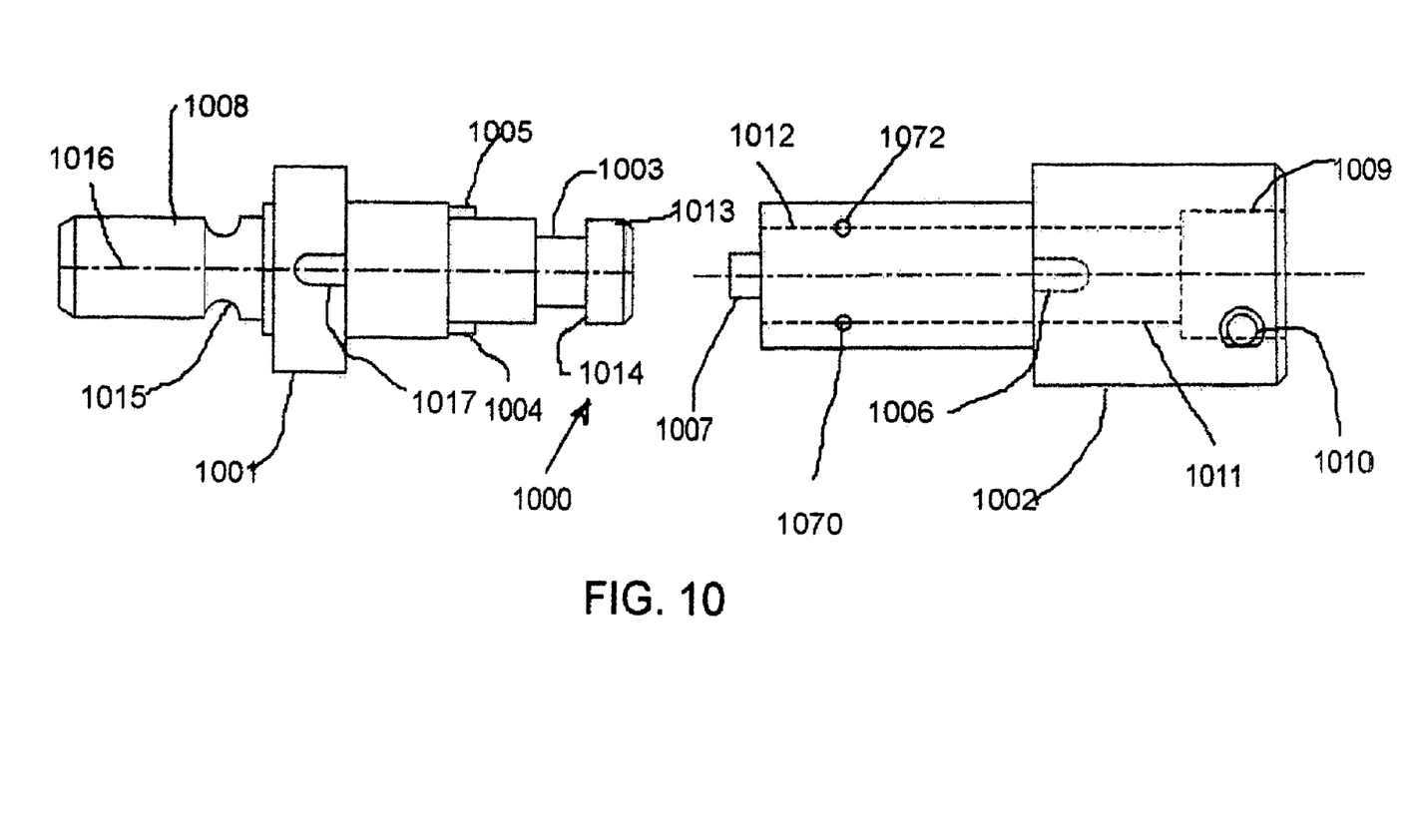
FIG. 10 is a top view of a male and female portion of a limited travel torsion control device.

FIG. 10 is a top view of a male portion 1001 and female portion 1002 of a limited travel torsion control device 1000 with the spring removed so the underlying parts can be better seen. Referring to FIG. 10 and FIGS. 18–21, male portion 1001 includes a recess 1017 configured to receive a first end 1801 of spring 1800, and for added strength end 1801 is welded into recess 1017 prior to use. Similarly, portion 1002 has a recess 1006 configured to receive a second end 1802 of spring 1800, and for added strength end 1802 is welded into recess 1006. Portion 1001 has an annular recess 1003 for reception of a pair of locking pins (not shown) inserted through passageways 1070 and 1072 to limit the maximum extension of device 1000 and help prevent separation of portion 1001 from portion 1002. For example, a 1.5 inch long zinc-coated pin of ³⁄₁₆ inch diameter with a 0.187 wall thickness could be used in either passageway 1070 or 1072 or both Portion 1001 has an annular segment 1005 of a predetermined arc, such as for example 220 degrees, which is configured to mate with an annular segment or tab 1007 to prevent over-rotation of portion 1001 relative to portion 1002 to thereby help prevent over-compression and overextension of spring 1800. Portion 1001 has external splines 1008 and portion 1002 has internal splines 1009 to allow easy connection to splines (not shown) of an existing roll tarp system Portion 1002 has a lock pin 1010 which is positioned so as to lock a matching male spline (not shown) of handle 26 or roll bar 20 into female splines. Portion 1002 has a longitudinal passageway configured to receive the right (as shown in FIGS. 10–11) part of portion 1001

Figure 11:
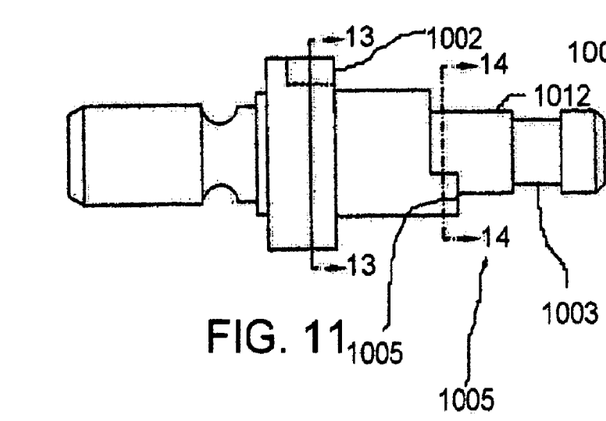
FIG. 11 is a side view of the male portion of the limited travel torsion control device of FIG. 10.
Figure 12:
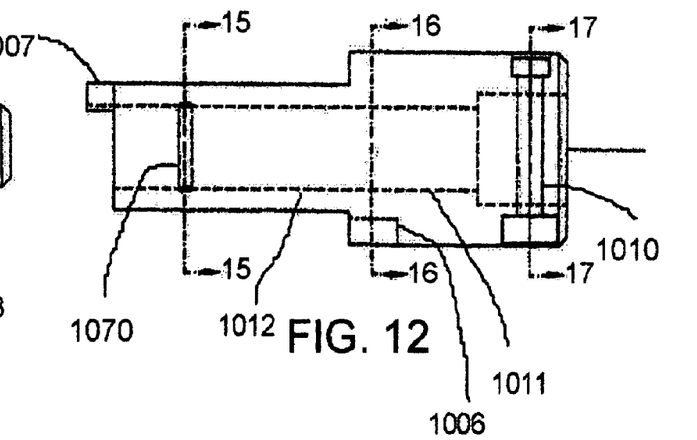
FIG. 12 is a side view of the female portion of the limited travel torsion control device of FIG. 10.

FIG. 11 is a side view of male portion 1001 of limited travel torsion control device 1000. FIG. 12 is a side view of female portion 1002 of limited travel torsion control device 1000. FIG. 11 and FIG. 12 show three manners of prevention of separation of portions 1001 and 1002 during operation of device 1000: lock pins, spring welding, and stop tabs. Reduced diameter end 1013 of portion 1001 is inserted into bore 1012 of portion 1002 until recess 1003 lies radially inward from passageways 1070 and 1072. Two lock pins (not shown) are inserted into passageways 1070 and 1072 to intersect recess 1003 and engage shoulder 1014 to help prevent end 1013 from moving out of bore 1012. Spring welding is best described by reference to FIGS. 10–13, FIG. 16 and FIGS. 18–21. Spring end 1801 and spring end 1802 are welded, respectively, into recess 1017 and recess 1006 and the welds thus produced must thereafter be broken, or spring 1801 itself must break before portions 1001 and 1002 can separate. Tab 1007 engages annular segment 1005 upon some predetermined rotation of portion 1001 relative to portion 1002, or vice versa. Once tab 1007 has engaged segment 1005 further rotation in an engaging direction is prevented and therefore overcompression and overextension of spring 1801 are physically prevented by such engagement. Lock pin 1010 serves to lock internal splines 1009 in a position mating with external splines (not shown) of either roll bar 20 or crank 26, depending on the orientation of device 1000. A recess 1015 on portion 1001 serves to receive a similar lock pin (not shown) to lock external splines 1008 within mating internal splines (not shown) of either roll bar 20 or crank 26, depending on the orientation of device 1000.

Figure 13:
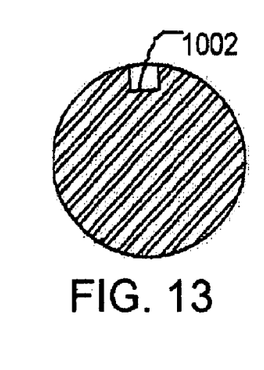
FIG. 13 is cross sectional view taken along lines 13—13 of FIG. 11.

FIG. 13 is cross sectional view taken along lines 13—13 of FIG. 11 to show recess 1017. While recess 1017 is oriented parallel to axis, any orientation of spring ends 1801 and 1802 (described below) could be used, although the axial orientation shown allows easier insertion and assembly of spring 1800 into device 1000.

Figure 14:
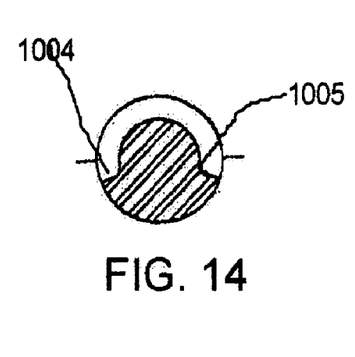
FIG. 14 is cross sectional view taken along lines 14—14 of FIG. 11.

FIG. 14 is cross sectional view taken along lines 14—14 of FIG. 11 to show a 220 degree rotational recess 1400. Any predetermined arcuate length could be utilized, and tab 1007 could be of greater arcuate length if strength was thereby increased in a significant way.

Figure 15:
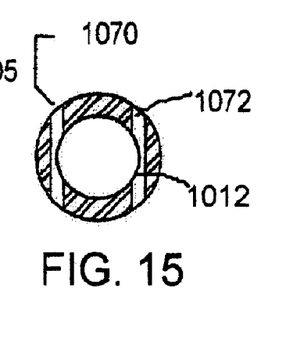
FIG. 15 is cross sectional view taken along lines 15—15 of FIG. 12.

FIG. 15 is cross sectional view taken along lines 15—15 of FIG. 12 to show how retention pin slots 1500 intersect bore.

Figures 16, 17:
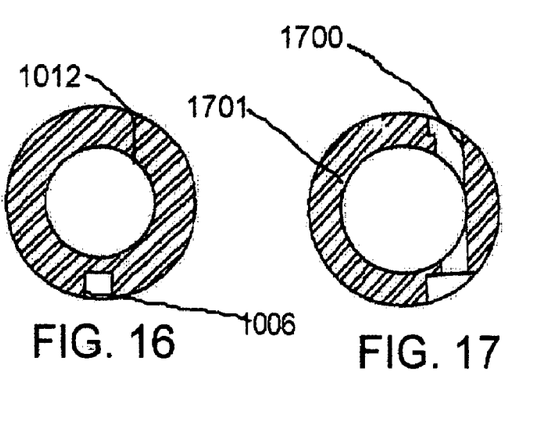
FIG. 16 is cross sectional view taken along lines 16—16 of FIG. 12.
FIG. 17 is cross sectional view taken along lines 17—17 of FIG. 12.

FIG. 16 is cross sectional view taken along lines 16—16 of FIG. 12 to show second spring retention slot or recess 1006 for similar purpose to recess 1017 as described above. Recess 1006 is located diametrically opposite from recess 1017, but could be located at any desired angular position relative to recess 1017.

FIG. 17 is cross sectional view taken along lines 17—17 of FIG. 12 to show a spline lock slot 1700 intersecting an enlarged bore 1701. Bore 1701 is provided with internal splines (described below) of conventional shape to allow device 1000 to attach to standard splines of roll bar 20 and U-joint 24 to transfer torque between rollbar 20 and U-joint 24 through device 1000. A locking bolt (not shown) would be positioned in slot 1700 to engage a recess similar to recess 1015 to hold male splines (not shown) similar to splines 1008 in engagement with such internal splines of connector 1002.

Figure 18:
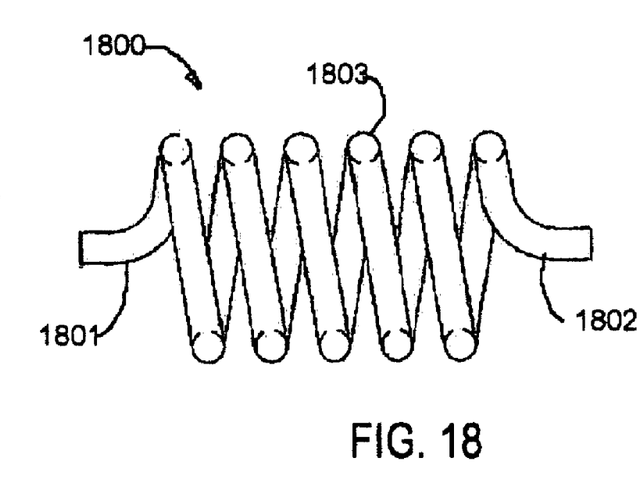
FIG. 18 is a top view of an exemplary spring for use in the device of FIG. 10.

FIG. 18 is a top view of an exemplary spring 1800 for use in device 1000. Spring 1800 has two ends 1801 and 1802 connected by a plurality of helical coils 1803 of predetermined spring constant. Spring 1800 is an ASTM A 401 chrome silicon steel wire 48.583 inches long of 0.3750 inches diameter having 6.5 coils with a coil outer diameter of 2.75 inches (2.00 inch internal diameter) with a spring rate of 9.841 pounds per degree rotation, although other sizes of springs might be used if a different spring constant were desired for any reason. The size of spring 1800 and the thickness of coils 1803 could be varied for roll-tarp systems of different size. Also, ends 1801 and 1802 could be metallurgically different, such as of increased hardness, different alloy or increased toughness to give longer spring life or better welding.

Figure 19:
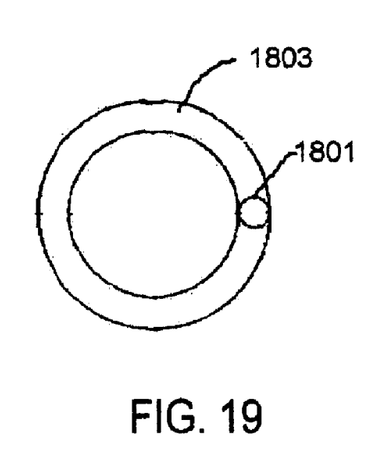
FIG. 19 is a left end view of the spring of FIG. 18.

FIG. 19 is a left end view of the spring 1800, showing a preferred axial orientation of end 1801.

Figure 20:
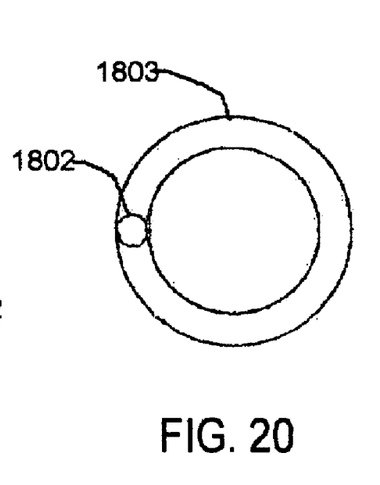
FIG. 20 is a right end view of spring 1800; showing a preferred longitudinal orientation of end 1802.

FIG. 20 is a right end view of spring 1800; showing a preferred longitudinal orientation of end 1802.

Figure 21:
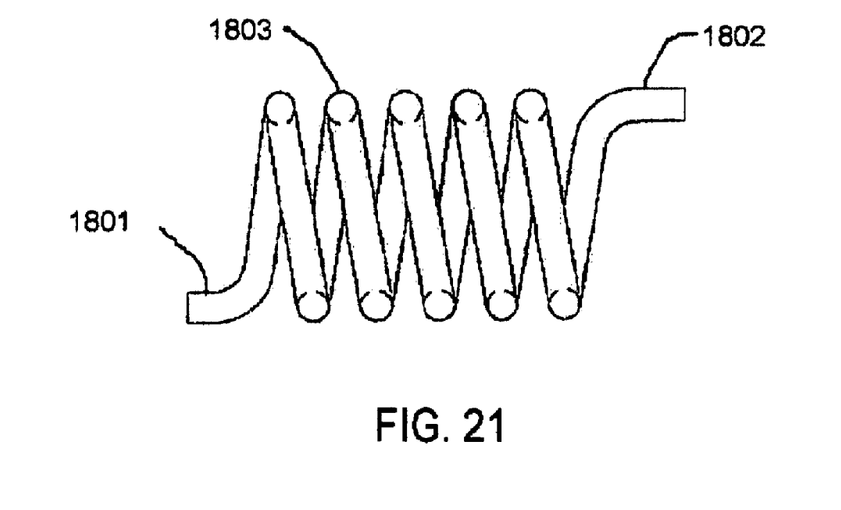
FIG. 21 is a side view of spring 1800 showing that ends 1801 and 1802 are located radially offset from but parallel to axis 1016 of absorber 1000.
Figures 22, 23:
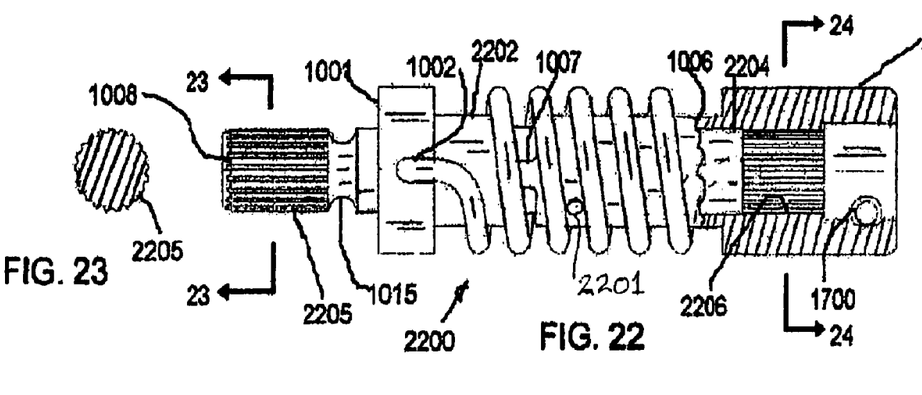
FIG. 22 is a top view, with the right side in partial cross section, of an assembled limited rotation torsion absorber/connector.
FIG. 23 is a cross-sectional view taken along lines 23—23 of FIG. 22.

FIG. 21 is a side view of spring 1800 showing that ends 1801 and 1802 are located offset from axis 1016 so that ends 1801 and 1802 are in proper axial alignment with recesses 1017 and 1006;

FIG. 22 is a top view, with the right side in partial cross section, of an assembled limited rotation torsion absorber/connector 2200, which comprises male portion 1001, female portion 1002, spring 1800, and a retainer pin 2201. Male portion 1001 has external splines 2205. For mating with a Shur-Lok roll bar, ¹⁶⁄₃₂ inch D.P. splines are used, with 21 splines having a 1.3750 inch major diameter and a 1.2750 inch minor diameter, although any desired spline configuration could be provided to allow connection to any other make of roll bar 20. Portion 1001 has a projection 2202 with an annular recess 2203. Portion 1002 has a projection 2204 with a bore 2205 of a diameter slightly larger than the outer diameter of projection 2202, so that projection 2202 can slide telescopically into bore 2205.

FIG. 23 is a cross-sectional view taken along lines 23—23 of FIG. 22 showing the preferred 21-spline configuration used for male splines 2205 of connector 2200.

Figure 24:
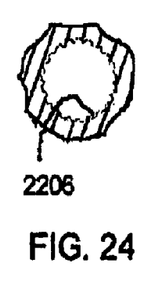
FIG. 24 is a cross-sectional view, with outer portions partially cutaway, taken along lines 24—24 of FIG. 22.

FIG. 24 is a cross-sectional view, with outer portions partially cutaway, taken along lines 24—24 of FIG. 22 showing female splines 2206 of connector 2200. These are a 21-spline configuration with a 1.3450 major diameter and a 1.2450 inch minor diameter for mating with splines 2205 so that connector 2000 connects readily to a Shur-Lok® roll tarp system.

Figure 25:
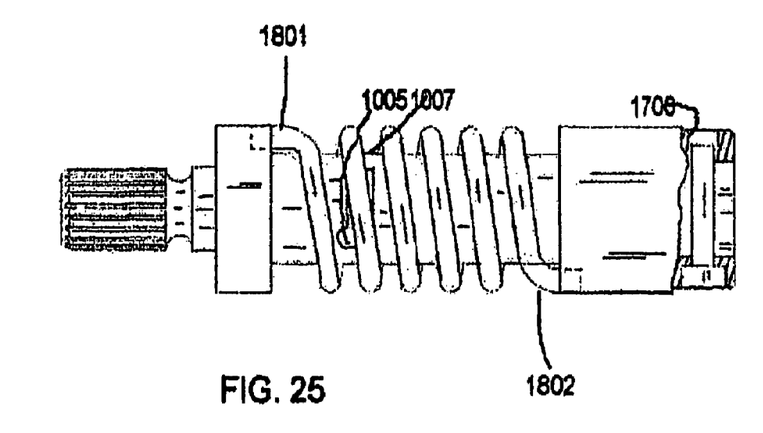
FIG. 25 is a side view of the absorber of FIG. 22.

FIG. 25 is a side view of connector 2200 to better show the location of end portions 1801 and 1802 in recesses 1017 and 1006. The right portion of FIG. 25 is shown in cross-section to further show the location of passageway 1700 for receiving a locking bolt to hold splines 2006 onto a corresponding set of male splines similar to splines 2005 by engaging an annular recess similar to recess 1015. A 2.25 inch or 2.5 inch long ⅜ inch locking bolt (not shown) or other suitable bolt can be used in passageway 1700 to lock absorber 22 onto either roll bar 20 or U-joint 24, depending on which has female and which has male splines in the particular roll tarp system in which absorber 22 is used. Tabs 1005 and 1007, which lie under spring 1800, allow for about 90 degrees of rotation of connector 1001 relative to 1002 and then engage to prevent over-rotation or overstressing of spring 1800, thereby increasing the useful life of spring 1800.

In a less preferred alternate exemplary adapter the helical spring 404 is replaced by a tough but resilient polymeric spring, such as one selected from the group consisting essentially of plastic and rubber.

While ends 1801 and 1802 extend axially, spring 1800 could instead have opposite ends extending radially toward axis 1016 into radial holes or recesses (not shown). The difficulty with radial orientation is that spring assembly and removal is made much harder since the ends then have to be pried out of such holes before the spring can be pulled axially off any underlying projections. The axial mounting and welding of spring ends 1801 and 1802 longitudinal recess 1017 and 1006 is much easier.

Instead of the resilient cover 501, a cover like that on an automobile shock absorber could be utilized. That is, the outer cover might instead be a tubular telescopic external metallic shell affixed to the connectors and configured to cover spring 1801 while permitting rotation and longitudinal movement of connector 1001 relative to connector 1002. A flexible cover is preferred since it fits more snugly and thus seals better against moisture and because it is cooler to the touch when out in the sun for extended periods. If the outer shell was rigid and telescopic, the shell could have a first tubular member connected to the first connector and a second tubular member telescopically each having an inwardly projecting flange (not shown) that go engage upon full extension to prevent overextension of said adapter.

The above exemplary embodiments describe the best modes of making and using the invention known at this time. Each exemplary embodiment is provided in satisfaction of the dual statutory duties of best mode disclosure and enablement. However, there are numerous other embodiments possible as, as will be apparent from the fact that three different exemplary embodiments are shown and others are described above. For example, a roll-tarp system might be used on a farm vehicle, a railroad car, a barge, or any other open-top container system. Also, the stiffness of spring 404 or 1800 might prevent bending sufficiently that sleeves 407 and 408 and slide piece 409 are found not to be needed and might be eliminated, even though the best mode uses them and even though system 1000 is safer with all the interlocking and rotation limiting features space bar provided by sleeves 407 and 408. Also, while the best mode is an accessory to supplement or replace the U-joint of roll-tarp systems such as SHUR-LOK or AGRI-COVER or TRUCKIN' TARP, or the like, the exemplary best mode embodiment would be applicable most other roll-tarp systems and other roll tube tightening applications. That is, the exemplary torsional absorber 2200 has broad applicability to any similar situation where over-tightening of a roll bar is possible. For example, a crank motor drive shaft presents an opportunity for improvement by the self-tightening, self-limiting and safety enhancing aspects of systems such as exemplary unit 100, 1000, 2200 or other embodiments within the scope of the invention. This would be particularly the case where U-joints are used to connect a crank to pay roll bar because U-joints inherently have only four 90-degree incremental rotation positions and system 100 allows numerous positions therebetween without the necessity for spline adjustments and without any overstressing caused by over rotation of the power shaft.

We have no intention of dedicating any invention disclosed in the above specification to the public, whether such invention is claimed or not. On the contrary, we ask that the broad nature of the invention be recognized and that any such disclosed, but unclaimed, invention be considered to be covered by the following claims in accordance with the doctrine of equivalents. That is, we intend no such dedication to the public as was found in the case of *Baker vs. Maxwell*.

We recognize that this disclosure must end at some point and cannot go we also recognize that technology advances and features that are disclosed herein may be more replaced in the future by devices that are functionally similar to produce similar or, even though they may appear structurally somewhat different. It is intended to that the following claims encompass any such advances under the doctrine of equivalents. Accordingly, this disclosure should be viewed as exemplary and open were rather than limiting and close-ended. The following claims should just being given an expansive scope of protection under the doctrine of equivalents to the fullest extent possible without encompassing prior art or anything obvious from the prior art.

What is claimed is:

1. A roll-tarp assembly for covering and uncovering a container opening, said assembly comprising:
    a tarp,
    a rotary power shaft,
    a roll bar attached to said tarp for rolling said tarp from a first unlatched position over the container opening to a second captured position and then subsequently rotated to a latched position,
    a first connector configured for transferring rotary power to said roll bar,
    a second connector configured for receiving rotary power from said power shaft, and
    a resilient member having opposite first and second ends attached, respectively, to each of said first and second connectors configured for transferring rotary power from said first to said second connector and allowing limited, force-responsive rotation in said captured position of said first connector in a tarp tightening direction relative to said second connector during movement of said roll bar to its latched position, so as to help minimize excessive torque on said roll bar in said tarp tightening direction during movement from said captured to said latched position.

2. A roll-tarp assembly in accordance with claim 1 wherein said member is a helical spring.

3. A roll-tarp assembly in accordance with claim 2 wherein said member is metallic.

4. A roll-tarp assembly in accordance with claim 3 wherein said opposite first and second ends are attached by welds, respectively, to said first and second connectors.

5. A roll-tarp assembly in accordance with claim 4 wherein said opposite ends extend parallel to an axis of said resilient member.

6. A roll-tarp assembly in accordance with claim 5 wherein said connectors each have a longitudinal recess configured to receive one of said opposite ends.

7. An adapter for connecting a rotary power shaft to a roll bar of a roll-tarp assembly, said adapter comprising:
- a first connector configured for transferring rotary power to the roll bar,
- a second connector configured for receiving rotary power from the power shaft, and
- a resilient member connecting said first and second connectors for transferring rotary power from said first to said second connector and allowing limited, force-responsive rotation of said first connector in a tarp tightening direction relative to said second connector, so as to help minimize overtorque on said connectors and roll bar,
- wherein said first connector has an axial projection configured to extend within said resilient member and has a releasable retainer configured for attaching said projection to said second connector while allowing at least limited rotation of said first connector relative to said second connector.

8. An adapter in accordance with claim 7 wherein said second connector has an axial second projection configured to extend within said resilient member.

9. An adapter in accordance with claim 8 wherein said attachment of said releasable retainer is configured for attaching said second projection to said first projection while allowing at least limited rotation of said first connector relative to said second connector.

10. An adapter in accordance with claim 9 wherein one of said projections is configured to extend within the other of said projections during operation.

11. An adapter in accordance with claim 7 wherein said retainer comprises an annular recess on one of said projections, at least one passageway that is a geometric chord intersecting said annular recess, and at least one pin disposed in said passageway, whereby said pin engages said one of said projections to releasably lock said first connector to said second connector for preventing separation of said adapter in the event said resilient member breaks.

12. A roll-tarp assembly in accordance with claim 1 further comprising a compressible and extendable cover configured to extend from said first to said second connector so as to help seal said resilient member against the environment.

13. A roll-tarp assembly in accordance with claim 1 further comprising a compressible and extendable cover configured to extend from said first to said second connector so as to help seal said spring against the environment.

14. An adapter for connecting a rotary power shaft to a roll bar of a roll-tarp assembly, said adapter comprising:
- a first connector configured for transferring rotary power to the roll bar,
- a second connector configured for receiving rotary power from the power shaft, and
- a resilient member attached to said first and second connectors for transferring rotary power from said first to said second connector and allowing limited, force-responsive rotation of said first connector in a tarp tightening direction relative to said second connector, so as to help minimize overtorque on said connectors and roll bar
- wherein said second connector is configured to extend within said resilient member and at least partially within said first connector and said second connector has a releasable retainer configured to retain said second connector at least partially within said first connector while allowing at least limited rotation, limited extension and limited retraction of said first connector relative to said second connector.

15. A roll-tarp assembly for covering a container opening, said assembly comprising:
- a tarp,
- a rotary power shaft,
- a roll bar attached to said tarp for extending said tarp over the container opening,
- a latch plate for capturing said roll bar in a captured position under said latch plate with said tarp extended fully over the container opening,
- a U-joint connected to said power shaft,
- a first connector attached to said U-joint and configured for receiving rotary power from said power shaft through the U-joint,
- a second connector attached to said roll bar and configured for transferring rotary power to said roll bar, and
- a resilient member connecting said first and second connectors for transferring rotary power from said first to said second connector and allowing limited, force-responsive rotation of said first connector in a tarp tightening direction relative to said second connector while said roll bar is in said captured position to thereby allow limited rotation of said rotary power shaft in said tarp tightening direction relative to said roll bar without breakage of said roll bar, power shaft, U-joint, or connectors.

16. An adapter in accordance with claim 15 wherein said resilient member is configured to allow more than 90 degrees of said limited rotation of said first connector relative to said second connector following latching of said roll bar without said breakage.

17. An adapter in accordance with claim 16 wherein the power shaft is a rotary crank.

18. An adapter in accordance with claim 17 wherein said rotary crank is weighted so as to counteract any residual spring torque resulting from said limited rotation tending to lift said crank.

19. An adapter in accordance with claim 18 wherein the tarp assembly is located on an open top semi-trailer.

20. An adapter for connecting a rotary power shaft to a roll bar of a roll-tarp assembly, said adapter comprising:
- a first connector configured for attachment to and for transferring rotary power to the roll bar,
- a second connector configured for attachment to and receiving rotary power from the power shaft,
- a resilient member attached to said first and second connectors for transferring rotary power from said second to said first connector, said resilient member being configured to allow limited, force-responsive rotation of said second connector in a tarp tightening direction relative to said first connector while said roll bar is in a captured position so as to develop a residual rotational force in said tarp tightening direction within said resilient member,
- a latching mechanism for said power shaft to hold said second connector in a set position while said roll bar is in said captured position and said residual force remains in said resilient member, so that any loosening of the tarp results in rotation of said first connector in a tarp tightening direction in response to said residual force to tighten said tarp.

21. A method of automatically tightening a roll-tarp assembly covering a container opening, said method comprising the steps of:

rolling a roll bar across said opening from a first side to a second side of said opening and capturing said roll bar on said second side, tightening said tarp by rotating a power shaft operably connected through a resilient member to said roll bar in a tarp tightening direction while said roll bar is captured, applying a residual rotational stress to said a roll bar by continuing to rotate said power shaft in said tarp tightening direction a limited amount while said roll bar is captured, restraining said power shaft from rotation while said residual rotational stress is still applied to said roll bar, and subsequently automatically rotating said roll bar in said tarp tightening direction by application of said residual rotational force on said roll bar to further tighten said tarp without unlatching said power shaft and without removing said roll bar from said captured position.

22. A method in accordance with claim 21, wherein said power shaft is a crank and said restraining of said power shaft includes latching a crank handle attached to said crank in a latch mechanism.

23. A method in accordance with claim 21 wherein said latch mechanism is affixed to a side of a truck trailer.

24. A method in accordance with claim 21 wherein said latch mechanism is affixed to a rear end of a truck trailer.

25. A method in accordance with claim 21 wherein said resilient member is a spring and said method further comprises the step of interposing said spring between a roll bar and a U-joint of the roll tarp system.

26. A method in accordance with claim 25, wherein said spring has its ends connected to two interconnected connectors so that if said spring breaks, said interconnection of said connectors prevents separation of said power shaft from said roll bar, to thereby help prevent damage to surrounding objects by said power shaft.

27. A method of tightening a roll-tarp assembly covering a container opening, said method comprising the steps of:
   interposing a resilient member between a roll bar and a power shaft of said assembly;
   connecting opposite ends of said resilient member to connectors which are affixed, respectively to said roll bar and said power shaft;
   connecting said connectors to each other to prevent said interconnected roll bar, resilient member and power shaft from separating in the event said resilient member should break;
   rotating said power shaft to roll said roll bar across said opening from a first side to a second side of said opening while unfurling a tarp attached to said roll bar to cover said opening and capturing said roll bar on said second side,
   tightening said tarp by rotating said power shaft to rotate one of said connectors, to thereby rotate said member, to thereby rotate said second connector to thereby rotate said roll bar, and
   latching said power shaft so as to maintain said tarp in said covering position while maintaining said connectors in interconnected relationship to continue to prevent separation of said power shaft from said roll bar in the event said resilient member should break.

28. A method in accordance with claim 27 wherein said interconnection of said connectors comprises an annular wall on one of said connectors and a radially extending projection on the other of said connectors.

29. A method in accordance with claim 28, wherein said wall is a wall of a groove on an outer wall of one connector and said projection is a removable member inwardly projecting from an inner wall of a second of said connectors.

30. A method in accordance with claim 29, wherein said removable member is accessible from the exterior of the second projector to facilitate selective separation of said connectors for repair or maintenance.

31. A method of using a roll-tarp assembly covering a container opening, said method comprising the steps of:
   interposing a resilient member between a roll bar and a power shaft of said assembly;
   connecting opposite ends of said resilient member to connectors which are affixed, respectively to said roll bar and said power shaft;
   connecting said connectors to each other to prevent said interconnected roll bar, member and power shaft from separating in the event said resilient member should break;
   rotating said power shaft to roll said roll bar across said opening from a first side to a second side of said opening while unfurling a tarp attached to said roll bar to cover said opening,
   capturing said roll bar on said second side so as to prevent,
   tightening said tarp by rotating said power shaft in a tightening direction to tighten said tarp while said roll bar is captured, and
   further rotating said power shaft in a tightening direction when said tarp is already tightened until a desired rotational position of said power shaft is reached by rotating said power shaft to rotate said second connector and absorbing said further rotation in said tightening direction in said resilient member while said first connector is restrained from further rotation and while creating a residual force in said resilient member tending to rotate said power shaft or roll bar in said tightening direction so as to eliminate said residual force; and
   fastening said power shaft in said desired rotational position with said residual force still present.

32. Apparatus in accordance with claim 1 wherein said resilient member is resistant to bending along its longitudinal axis but is configured to allow force response rotation of said opposite first and second ends relative to each other about said longitudinal axis.

33. Apparatus in accordance with claim 7 wherein said resilient member has first and second opposite ends and is resistant to bending along its longitudinal axis but is configured to allow force response rotation of said ends relative to each other about said longitudinal axis.

34. Apparatus in accordance with claim 14 wherein said resilient member is resistant to bending along its longitudinal axis but is configured to allow force response rotation about its longitudinal axis.

35. Apparatus in accordance with claim 20 wherein said resilient member is resistant to bending along its longitudinal axis but is configured to allow force response rotation about its longitudinal axis.

36. A method in accordance with claim 21 wherein said a resilient member is disposed between said power shaft and said roll bar and said resilient member is resistant to bending along its longitudinal axis but is configured to allow force response rotation about its longitudinal axis.

37. A method in accordance with claim 27 wherein said a resilient member is disposed between said power shaft and said roll bar and said resilient member is resistant to bending along its longitudinal axis but is configured to allow force response rotation about its longitudinal axis.

38. A method in accordance with claim 31 wherein said a resilient member is disposed between said power shaft and said roll bar and said resilient member is resistant to bending along its longitudinal axis but is configured to allow force response rotation about its longitudinal axis.

39. A roll-tarp assembly for covering and uncovering a container opening, said assembly comprising:
- a tarp,
- a rotary power shaft,
- a roll bar attached to said tarp for rolling said tarp from a first unlatched position over the container opening to a second captured position and then subsequently rotated to a latched position,
- a U-joint attached to said roll bar,
- a first connector configured for transferring rotary power to said roll bar through said U-joint,
- a second connector configured for receiving rotary power from said power shaft, and
- a resilient member having opposite first and second ends attached, respectively, to each of said first and second connectors configured for transferring rotary power from said first to said second connector.

* * * * *